(12) United States Patent
Ihrke et al.

(10) Patent No.: US 8,467,903 B2
(45) Date of Patent: Jun. 18, 2013

(54) TENDON DRIVEN FINGER ACTUATION SYSTEM

(75) Inventors: Chris A. Ihrke, Hartland, MI (US);
David M. Reich, Huntsville, AL (US);
Lyndon Bridgwater, Houston, TX (US);
Douglas Martin Linn, White Lake, MI (US); Scott R. Askew, Houston, TX (US); Myron A. Diftler, Houston, TX (US); Robert Platt, Houston, TX (US);
Brian Hargrave, Dickenson, TX (US);
Michael C. Valvo, League City, TX (US); Muhammad E. Abdallah, Houston, TX (US); Frank Noble Permenter, Webster, TX (US); Joshua S. Mehling, League City, TX (US)

(73) Assignees: GM Global Technology Operations LLC, Detroit, MI (US); The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 901 days.

(21) Appl. No.: 12/564,086

(22) Filed: Sep. 22, 2009

(65) Prior Publication Data
US 2011/0071678 A1 Mar. 24, 2011

(51) Int. Cl.
*B25J 18/00* (2006.01)
*B25J 19/02* (2006.01)
*B25J 15/08* (2006.01)
*G06F 7/00* (2006.01)
*B25J 17/02* (2006.01)

(52) U.S. Cl.
USPC .............. 700/258; 700/245; 901/21; 901/28; 901/46

(58) Field of Classification Search
USPC ....... 74/89.23, 490.01–490.15; 700/245–264; 901/1–50
See application file for complete search history.

(56) References Cited

U.S. PATENT DOCUMENTS

| | | | | |
|---|---|---|---|---|
| 4,834,761 A | * | 5/1989 | Walters | 623/26 |
| 4,921,293 A | * | 5/1990 | Ruoff et al. | 294/111 |
| 4,955,918 A | * | 9/1990 | Lee | 623/24 |
| 4,986,723 A | | 1/1991 | Maeda | |

(Continued)

FOREIGN PATENT DOCUMENTS

| | | |
|---|---|---|
| EP | 1195151 A1 | 10/2002 |
| JP | 2145282 A | 6/1990 |
| JP | 2000325375 A | 11/2000 |
| JP | 2008149444 A | 7/2008 |

OTHER PUBLICATIONS

Askew, Scott. "NASA Robotics." robotics.nasa.gov. NASA, Oct. 1, 2002. Web. Sep. 17, 2009, http://robotics.nasa.gov/courses/fall2002/event/oct1/NASA_Robotics_20021001.htm.

*Primary Examiner* — Khoi Tran
*Assistant Examiner* — Dale Moyer
(74) *Attorney, Agent, or Firm* — Quinn Law Group, PLLC

(57) ABSTRACT

A humanoid robot includes a robotic hand having at least one finger. An actuation system for the robotic finger includes an actuator assembly which is supported by the robot and is spaced apart from the finger. A tendon extends from the actuator assembly to the at least one finger and ends in a tendon terminator. The actuator assembly is operable to actuate the tendon to move the tendon terminator and, thus, the finger.

17 Claims, 3 Drawing Sheets

U.S. PATENT DOCUMENTS

| | | |
|---|---|---|
| 5,184,319 A | 2/1993 | Kramer |
| 5,187,993 A * | 2/1993 | Nicholson et al. ............ 74/89.38 |
| 5,447,403 A | 9/1995 | Engler, Jr. |
| 6,042,555 A | 3/2000 | Kramer et al. |
| 6,101,889 A * | 8/2000 | Laskey .......................... 74/89.23 |
| 6,244,644 B1 * | 6/2001 | Lovchik et al. ................ 294/111 |
| 8,060,250 B2 * | 11/2011 | Reiland et al. ................. 700/245 |
| 2008/0077159 A1 * | 3/2008 | Madhani et al. ............... 606/130 |
| 2010/0010670 A1 | 1/2010 | Matsukuma et al. |
| 2010/0081969 A1 * | 4/2010 | Ihrke et al. ..................... 600/587 |
| 2010/0259057 A1 * | 10/2010 | Madhani ........................ 294/106 |
| 2012/0078053 A1 * | 3/2012 | Phee et al. ..................... 600/139 |

* cited by examiner

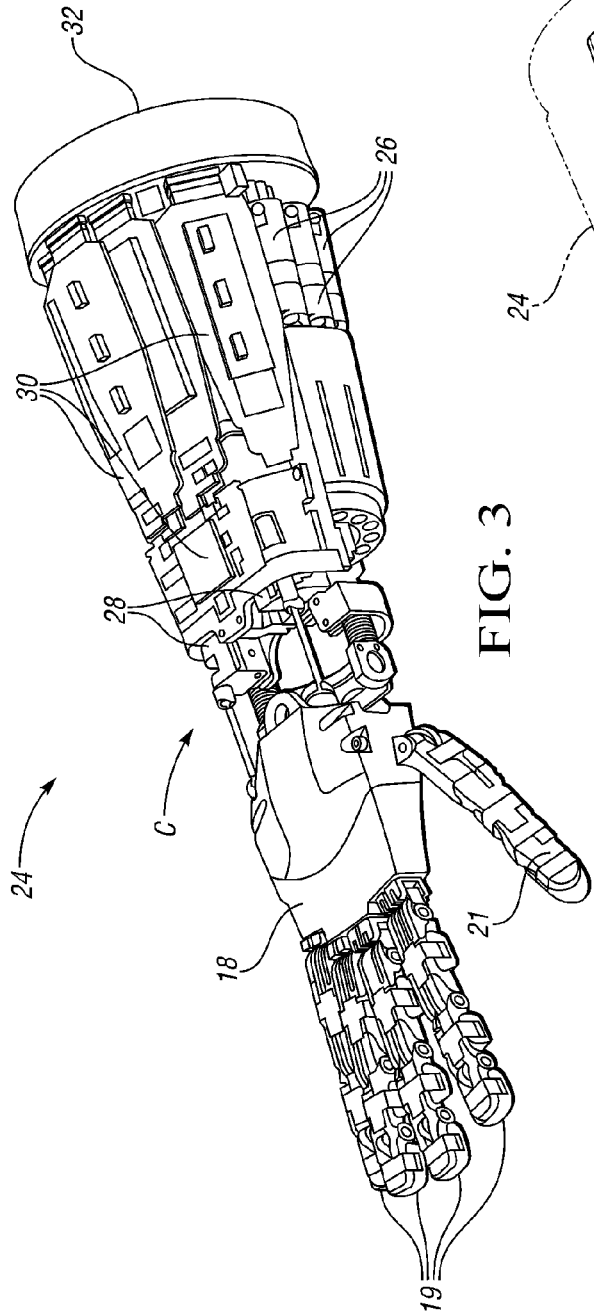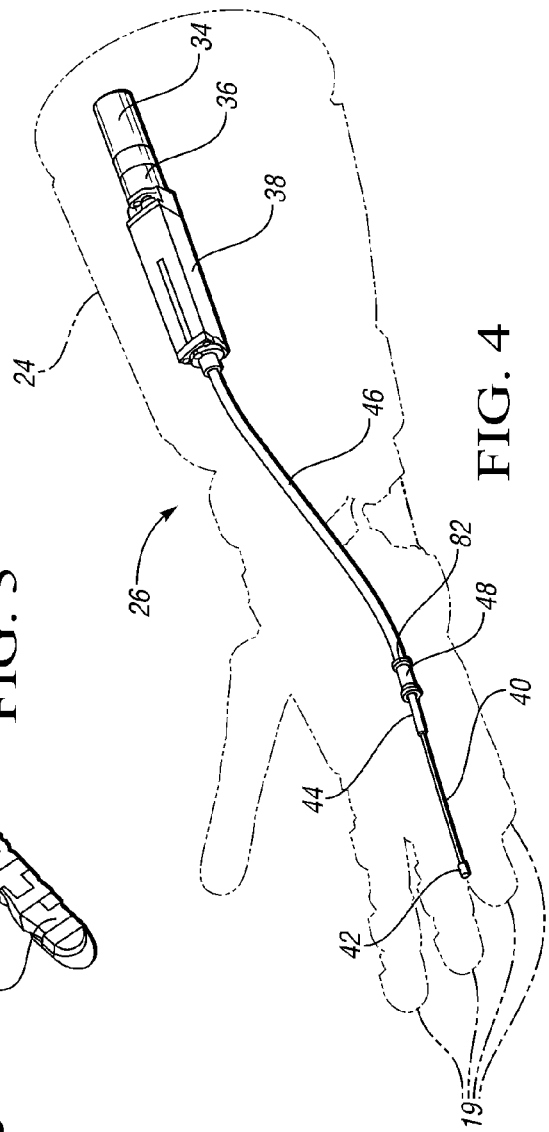
FIG. 3
FIG. 4

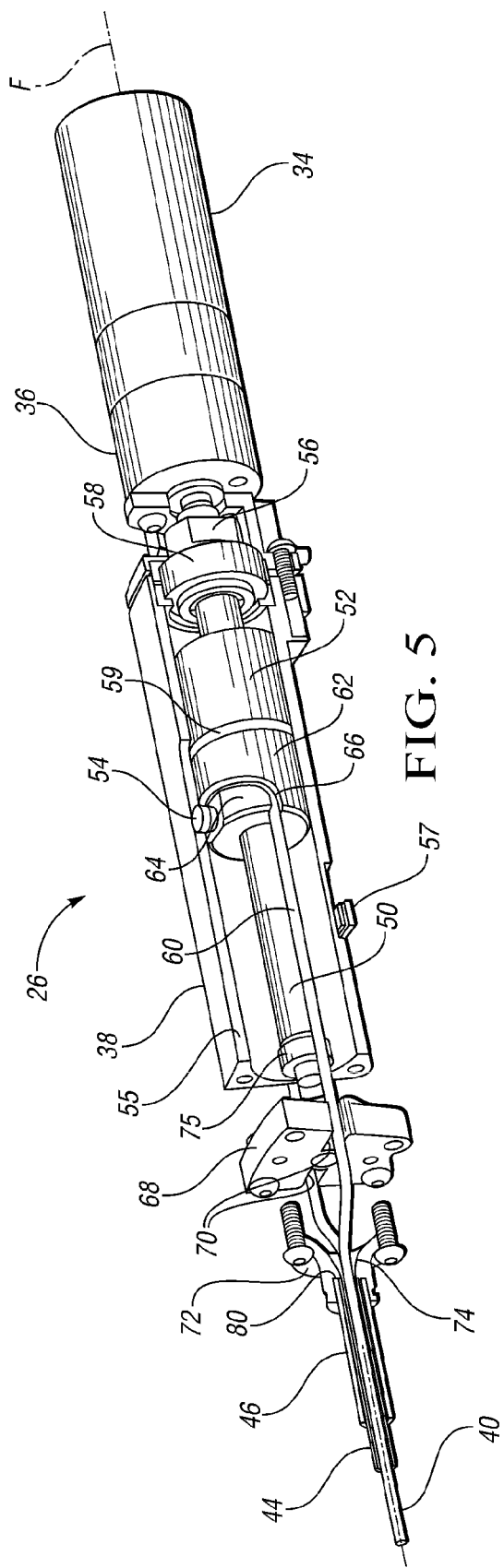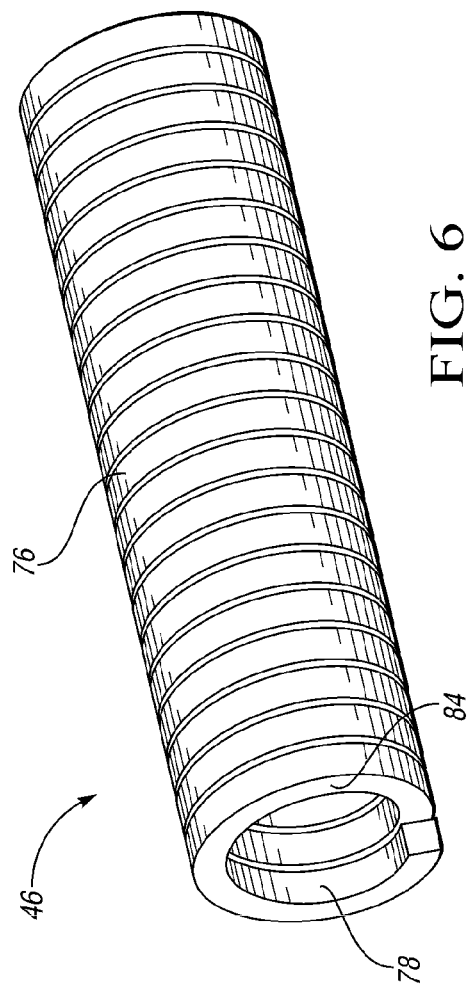

US 8,467,903 B2

TENDON DRIVEN FINGER ACTUATION SYSTEM

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to the motion control of a humanoid robot, and more specifically an actuation system for fingers of the humanoid robot.

BACKGROUND OF THE INVENTION

Robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well as control over the applied torque or force, motion, and the various grasp types.

In order to approximate human movement each joint within the robot requires at least one actuator for each DOF. Additionally, these actuators must be packaged in an arrangement that approximately represents human structure and appearance.

SUMMARY OF THE INVENTION

Accordingly, an actuation system is provided herein for actuation of a finger for a dexterous humanoid robot.

The actuation system includes an actuator assembly, a tendon extending from the actuator assembly, and a tendon terminator mounted to the tendon at an opposing end from the actuator assembly. The actuator assembly is spaced apart from the tendon terminator to remotely actuate movement of the tendon terminator.

The humanoid robot includes a robotic hand having at least one finger. The finger actuator assembly is supported by the robot and spaced apart from the robotic hand. A tendon extends from the finger actuator assembly to the finger. The finger actuator assembly is operable to actuate the tendon to move the finger.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is schematic perspective illustration of a lower arm for the dexterous humanoid robot of FIGS. 1 and 2;

FIG. 4 is a schematic perspective illustration of a finger actuator for the dexterous humanoid robot of FIG. 1-3;

FIG. 5. is a schematic perspective partially cross-sectional illustration of a finger actuator assembly for the dexterous humanoid robot of FIG. 1-4; and FIG. 6 is a schematic perspective illustration of a conduit for the finger actuator for the dexterous humanoid robot of FIG. 1-5.

DESCRIPTION OF THE PREFERRED EMBODIMENT

Figure 1:
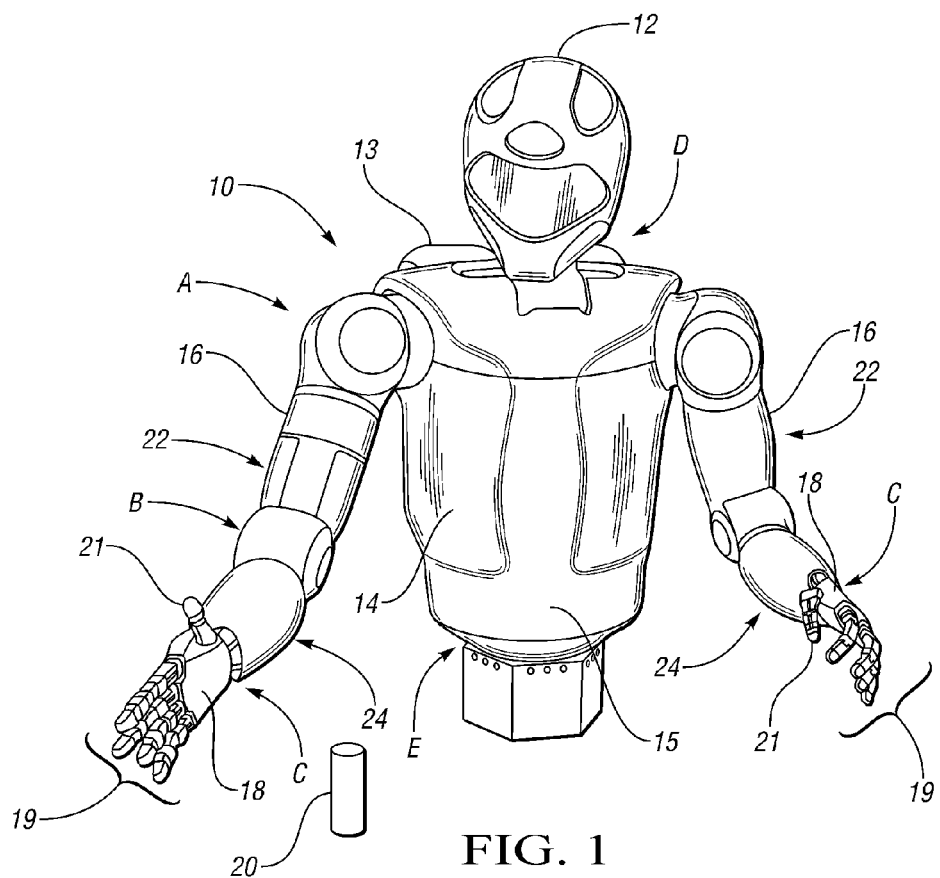
FIG. 1 is a schematic perspective illustration of a dexterous humanoid robot and in accordance with the invention.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19, and thumbs 21, with the various joints being disposed within or therebetween. The robot 10 may also include a task-suitable fixture or base (not shown) such as legs, treads, or another moveable or fixed base depending on the particular application or intended use of the robot. A power supply 13 may be integrally mounted to the robot 10, e.g., a rechargeable battery pack carried or worn on the back of the torso 14 or another suitable energy supply, to provide sufficient electrical energy to the various joints for movement of the same.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger joint assemblies (arrow F) positioned between the phalanges of each robotic finger 19.

Each robotic joint may have one or more DOF. For example, certain joints such as the shoulder joint assembly (arrow A) and elbow joint assembly (arrow B) may have at least two DOF in the form of pitch and roll. Likewise, the neck joint assembly (arrow D) may have at least three DOF, while the waist and wrist assemblies (arrows E and C, respectively) may have one or more DOF. Depending on task complexity, the robot 10 may move with over 40 DOF. Although not shown in FIG. 1 for simplicity, each robotic joint contains and is driven by one or more actuators, e.g., joint motors, linear actuators, rotary actuators, and the like.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15. Those skilled in the art will appreciate that since the robot 10 is intended to simulate a humanoid, the various extremities—e.g., the arms 16 including upper arms 22, lower arms 24, and hands 18, etc.—will be symmetrical and essentially include an identical symmetrical skeletal structure on both the left and right sides. Therefore, when viewed frontally, as in FIG. 1, the right arm 16 and right hand 18 will actually be on the left of the drawing.

Figure 2:
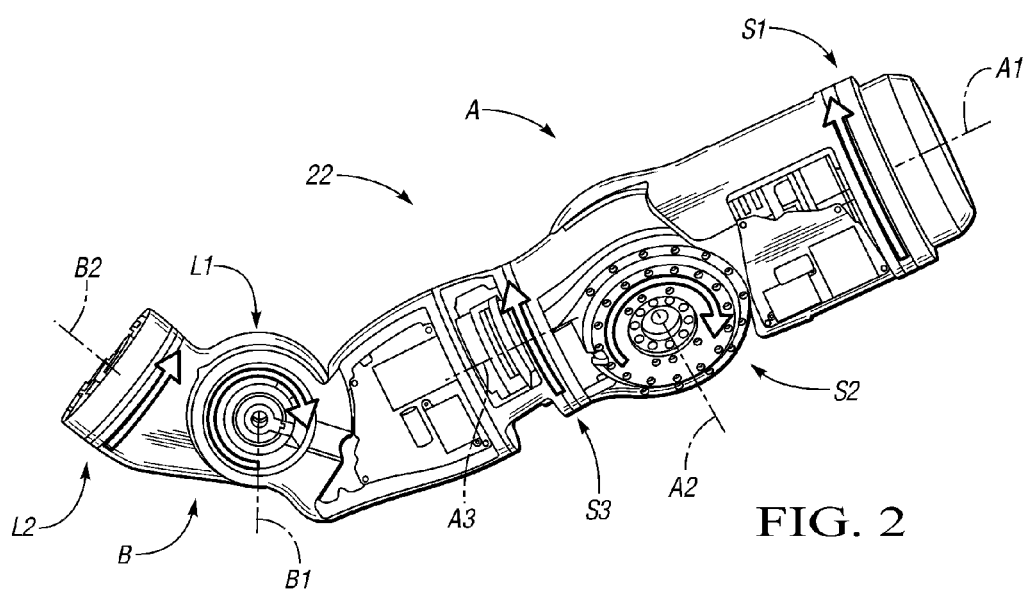
FIG. 2 is schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis A1 moves a second shoulder axis A2 for the second shoulder joint S2 into a desired position. Based upon the position of the first shoulder joint S1, rotation of the second shoulder joint S2 about the second shoulder axis A2 then moves the arm 16 up and down relative to the torso 14, or forward and backward relative to the torso 14. The third shoulder joint S3 rotates the upper arm 22 about a third shoulder axis A3. Rotation of the third shoulder joint S3 rotates the upper arm 22 axially about the third shoulder axis A3, i.e. rotation of the third shoulder joint S3 rotates the elbow joint assembly (arrow B) to face upwards or downwards. Therefore, together the first shoulder joint S1, the second shoulder joint S2, and the third shoulder joint S3 form the motions of a shoulder joint assembly (arrow A).

The upper arm 22 also includes an elbow joint assembly (arrow B) which includes a first elbow joint L1 and a second elbow joint L2. The first elbow joint L1 and second elbow joint L2 each provide a degree of freedom. Together the first elbow joint L1, and the second elbow joint L2 perform the movements that represent the movements a human elbow can perform. Rotation of the first elbow joint L1 about a first elbow axis B1 causes the portion of the upper arm 22 below the elbow joint assembly (arrow B) to bend and straighten. Additionally, rotation of the second elbow joint L2 about a second elbow axis B2 causes the portion of the upper arm 22 below the elbow joint assembly (arrow B) to rotate axially, i.e. rotation of the second elbow joint L2 about the second elbow axis B2 rotates the lower arm 24 and hand 18 (FIG. 1) to face palm up or down.

FIG. 3 illustrates the lower arm 24, including the wrist joint assembly (arrow C), the hand 18, the fingers 19, and thumb 21. The lower arm 24 includes a plurality of finger (and thumb) actuators 26 and a plurality of wrist actuators 28. Additionally, a plurality of controls 30 for the finger actuators 26 and the wrist actuators 28 are also supported on the lower arm 24. The lower arm 24 is attached to a load cell 32 which is used to connect the lower arm 24 with the upper arm 22.

The finger actuators 26 include the actuators for the thumb 21. Multiple finger actuators 26 may correspond to each finger 19 and thumb 21. In general, there must be one finger actuator 26 for each DOF available plus one additional finger actuator 26. Therefore, each finger 19 having three DOF requires four finger actuators 26, each finger 19 having two DOF requires three finger actuators 26 and so on.

FIG. 4 is a schematic perspective view of a finger actuator assembly 26. The finger actuator assembly 26 includes a motor 34, a gear drive 36, an actuator housing 38, a tendon 40 and a tendon terminator 42. The tendon 40 extends from the actuator housing 38 toward one of the fingers 19. The tendon 40 is illustrated in an off-center position within the finger 19 as more than one tendon 40 may extend into each of the fingers 19. The motor 34, gear drive 36 and actuator housing 38 are located in the lower arm 24 to minimize the packaging space required within the fingers 19 and the thumb 21 and to allow for the larger components of the finger actuator assembly 26, such as the actuator housing 38, to be remotely packaged from the fingers 19 and the thumb 21.

The tendon 40 extends from the actuator housing 38 to the finger 19 and is protected by a conduit liner 44 and a conduit 46. In the embodiment shown, the tendon liner 44 is a Teflon® material and the tendon 40 is manufactured from a braided material. The material for the tendon 40 is a combination of Vectran™ and Teflon®. The Vectran™ is a high tensile strength material that is resistant to stretch and creep, which would adversely affect the performance of the tendon 40 over time, and the Teflon® assists in preventing wear due to movement of the tendon 40 relative to the conduit 46 and other components of the actuation system 30 that the tendon 40 contacts during operation.

The conduit 46 extends from the actuator housing 38 to a tension sensor 48. The tendon 40 and the conduit liner 44 extend past and through the tension sensor 48. In this manner, the conduit liner 44 assists in protecting the tendon 40 from abrasion against the tension sensor 48 as well. As the finger actuator 26 moves the tendon 40, the tendon 40 slides relative to the tension sensor 48 which is rigidly mounted to a hand support (not shown). The tendon 40 is terminated within the finger 19 at the tendon terminator 42. Movement of the tendon 40 causes relative movement of the tendon terminator 42, thus, moving the finger 19.

Force may be placed on the tendon terminator 42 either internally (by movement of the finger actuator 26) or externally (i.e. on the finger 19 by an object 20) which causes the tendon 40 to exert force on the finger actuator housing 38 (through the internal components of the finger actuator 26) in the direction of the finger 19. However, the tension sensor 48 is rigidly fixed to the hand support (not shown) and does not move. Likewise the finger actuator 26 is rigidly fixed to the forearm structure (not shown) and does not move. As a result, the conduit 46 is placed in compression as the tension in the tendon 40 would otherwise tend to decrease the distance between the finger actuator housing 38 and the finger 19, for example by moving one or both wrist axes (not numbered). The tension sensor 48 measures the force of compression on the conduit 46 to determine the amount of tension placed on the tendon 40. Tension in the tendons 40 is an important quantity to measure because it can be used by the control system of the robot 10 to calculate torques generated or experienced at the finger 19 joints, which in turn can be used by the control system for advanced torque or impedance control of the fingers 19 (and thumb 21).

FIG. 5 is a perspective, partially cross-sectional illustration of the finger actuator assembly 26. The motor 34 is powered to drive the gear drive 36 which causes rotation of a ball screw 50. A ball nut 52 is mounted on and has a threaded engagement with the ball screw 50. A guide pin 54 extends from the ball nut 52 and prevents rotation of the ball nut 52 in response to movement of the ball screw 50. The guide pin 54 extends at least partially through a slot 55 defined by the finger actuator housing 38. The finger actuator housing 38 prevents rotational movement of the guide pin 54, and thus the ball nut 52. Therefore, as the gear drive 36 rotates the ball screw 50, the ball nut 52 is translated axially along the ball screw 50. The motor 34, gear drive 36 and ball screw 50 define a finger actuator axis F along which the ball nut 52 travels.

The gear drive 36 is connected to the ball screw 50 with a coupling 56. The shaft of the gear drive 36 has a flat surface that corresponds to a flat surface on the coupling 56, this allows the coupling 56 to transmit the torque of the gear drive 36, without transmitting any axial load. Additionally, a bearing 58 is located between the coupling 56 and the ball screw 50 to reduce friction between the actuator housing 38 and the ball screw 50 and to carry the axial load transmitted from the tendon 60 to the ball screw 50.

A position sensor 57 is mounted to the finger actuator housing 38 to sense the axial position of the ball nut 52 along the ball screw 50. In the embodiment shown, the position sensor 57 is a Hall Effect sensor and a magnet 59 is attached to the ball nut 52. The position sensor 57 senses the magnet 59 as the ball nut 52 passes the position sensor 57. Therefore, a control system (not shown) for the finger actuator 26 can be designed to automatically or periodically update the linear position of the ball nut 52. The linear position of the ball nut 52 may also be compared relative to the rotational position of the motor 34 to calibrate or re-calibrate the control system (not shown) and prevent the finger actuator 26 from over translating the ball nut 52 in either axial direction along the ball screw 50. Calibrating the position of the ball nut 52 may be particularly useful after a power loss to the actuation system 10 where the position information may be not be retained and automatic calibration of the position of the ball nut 52 is desirable.

The tendon 40 is attached to the ball nut 52 with a tendon loop 60. Therefore, movement of the ball nut 52 will result in similar movement of the tendon 40. The movement of the tendon 40 will either straighten or bend the finger 19 depending on the connection of the actuator 26 to the hand 18 (shown in FIG. 3). An additional finger actuator 26 is utilized to perform the opposing straightening or bending motion. Therefore, each finger 19 (shown in FIG. 3) has at least one finger actuator 26 for each degree of freedom. In general each finger 19 has one actuator per degree of freedom plus one additional actuator. For example, a three DOF finger has four actuators and a four DOF finger has five actuators.

The tendon 40 forms the tendon loop 60 for attachment to the ball nut 52. The tendon 40 and the tendon loop 60 are preferably formed as a single piece and the tendon loop 60 is preferably an eye splice, which allows for secure attachment to the ball nut 52 without greatly reducing the strength of the tendon 40.

In the embodiment shown, a tendon housing 62 is secured to the ball nut 52 and moves therewith. The tendon housing 62 defines a tendon hook 64. The tendon loop 60 is fitted within the tendon hook 64 to removably retain the tendon 40 to the ball nut 52. The tendon hook 64 is preferably a groove within the tendon housing 62 that extends approximately halfway about the generally circularly shaped tendon housing 62. The tendon hook 64 may also include opposing axial channels 66 to assist in guiding and securing the tendon loop 60 to the tendon housing 62. The opposing axial channels 66 (only one shown) are parallel to the finger actuator axis F and diametrically opposite one another with respect to the axis F. The symmetrical arrangement to attach the tendon loop 60 on the tendon hook 64 results in axial forces (parallel to the finger actuator axis F and balanced about axis F) placed on the ball nut 52, which minimizes non-axial loading on the ball screw 50. Non-axial loading would result in contact between the tendon housing 62 or ball nut 52 and the actuator housing 38. Maintaining loading on the ball nut 52 in the axial direction, and balanced about the axis F, minimizes friction and, therefore, decreases wear on the various components within the actuator assembly 26 including the ball screw 50, ball nut 52, tendon housing 62, bearings 58, and actuator housing 38. Additionally, the tendon loop 60 is removably retained by the tendon hook 64 to allow for maintenance or repair of the finger actuator 26 or the tendon 40 and the tendon loop 60.

In the embodiment shown, the tendon housing 62 defines the tendon hook 64. However, other methods of forming the tendon hook 64 may also be utilized, including forming the tendon hook 64 with the ball nut 52. One skilled in the art would be able to determine the preferable manner for defining the tendon hook 64 for a given finger actuator 26 arrangement.

An end cap 68 is secured to the actuator housing 38. The end cap 68 defines guide slots 70 for guiding the tendon loop 60 from the actuator housing 38. The guide slots 70 may have curved surfaces to reduce wear on the tendon loop 60. An end cap bearing 75 is mounted on the ball screw 50 to allow rotation of the ball screw 50 relative to the end cap 68. Additionally, a splitter 72 is secured to the end cap 68. The splitter 72 defines a funnel-like splitter slot 74 which guide the axially opposing sides of the tendon loop 60 into the conduit liner 44, which is within the conduit 46.

FIG. 6 is a schematic perspective illustration of the conduit 46. The conduit 46 is wound into a coil shape utilizing a wire 76 having a square (or rectangular in another embodiment) cross-sectional shape. Once the wire 76 has been wound into the conduit 46, the square shape of the wire 76 provides a relatively smooth interior surface 78. Additionally, the conduit liner 44 (shown in FIGS. 4 and 5) is located within the conduit 46 to assist in protecting the tendon 40 (shown in FIGS. 4 and 5) from wear.

The conduit 46 is secured at a first end 80 (shown in FIG. 5) to the splitter 72 and at a second end 82 (shown in FIG. 4) to the tension sensor 48. As described above, tension sensor 48 is rigidly mounted to the hand support (not shown). Therefore, movement of the tendon 40 (shown in FIGS. 4 & 5) within the conduit 46 places the conduit 46 under compression. Flat sides 84 of the square wire 76 each contact the adjacent coil of the wire 76 and reduce the slipping between the relative coils when the conduit 46 is placed under compression to reduce kinking of the conduit 46. That is, the relative movement between wire 76 coils is reduced when compared with a wire 76 which has a round cross-sectional shape as the square wire 76 can withstand about three times the compressive load than a similarly sized wire having a round cross-sectional shape.

In the embodiment shown in FIGS. 1-6, the finger actuator assembly 26 allows for 1.4 inches of axial travel of the ball nut 52 and provides a pulling force of 50 pounds. Other distances of axial travel and pulling force may be generated based upon the length of the ball screw 50 and the sizes of the motor 34, gear drive 36 and tendon 40. One skilled in the art would be able to determine the appropriate amount of axial travel and pulling force for a specific finger actuator assembly 26.

While the best modes for carrying out the invention have been described in detail, those familiar with the art to which this invention relates will recognize various alternative designs and embodiments for practicing the invention within the scope of the appended claims

The invention claimed is:
1. An actuation system comprising:
a robotic hand; an actuator assembly operably connected to the robotic hand;
a tendon extending from the actuator assembly;

a tendon terminator mounted to the tendon at an opposing end from the actuator assembly, such that the actuator assembly is spaced apart from the tendon terminator;

a conduit surrounding the tendon for a substantial length of the tendon; and a tension sensor mounted with respect to the conduit and configured to measure the compression of the conduit to determine the tension in the tendon.

2. The actuation system of claim 1, wherein the actuator assembly includes:

an actuator motor;

a gear drive rotatably connected to the actuator motor;

a ball screw rotatably driven by the gear drive;

a ball nut axially moveable along the ball screw in response to rotation thereof; and wherein the tendon is secured to the ball nut for axial movement therewith.

3. The actuation system of claim 2, wherein the ball nut defines a tendon hook, and the tendon has a tendon loop that is removably secured to the ball nut with the tendon hook.

4. The actuation system of claim 3, wherein the tendon hook defines a pair of axially extending channels each for receiving a portion of the tendon loop, such that tension is axially placed on at least one of the ball screw and the ball nut components within the actuator.

5. The actuation system of claim 2, wherein the actuator assembly further includes:

a housing for the actuator assembly, wherein the ball screw, the ball nut and the tendon are at least partially located within the housing;

a position sensor mounted to the housing; and a magnet mounted to the ball nut to sense a relative linear position of the ball nut along the ball screw.

6. The actuation system of claim 1, further including:

a conduit liner surrounding the tendon for a substantial length of the tendon; and wherein the conduit surrounds the conduit liner for a substantial length of the tendon.

7. The actuation system of claim 6, wherein the conduit is formed from a coil of wire, and wherein the wire has one of a square and a rectangular cross-sectional shape.

8. The actuation system of claim 6, wherein the conduit extends from the actuator assembly to the tension sensor.

9. The actuation system of claim 8, wherein tension on the tendon through the tendon terminator results in a compressive force on the conduit.

10. A humanoid robot comprising:

a robotic hand including at least one finger;

a finger actuator supported by the robot and spaced apart from the at least one finger;

a tendon extending from the finger actuator to the at least one finger;

wherein the finger actuator is operable to actuate the tendon to move the at least one finger;

a conduit surrounding the tendon for a substantial length of the tendon; and a tension sensor mounted with respect to the conduit and configured to measure the compression of the conduit to determine the tension in the tendon.

11. The humanoid robot of claim 10, further comprising a forearm portion, and wherein the finger actuator is located in the forearm portion.

12. The humanoid robot of claim 10, wherein the finger actuator includes:

an actuator motor;

a gear drive rotatably connected to the actuator motor;

a ball screw rotatably driven by the gear drive;

a ball nut, axially moveable along the ball screw in response to rotation thereof;

wherein the ball nut defines a tendon hook and the tendon is secured to the tendon hook for axial movement with the ball nut; and wherein the tendon has a tendon loop that is removably secured to the ball nut with the tendon hook.

13. The humanoid robot of claim 12, wherein the tendon hook defines a pair of axially extending channels each for receiving a portion of the tendon loop, such that tension is axially placed on the ball screw and the ball nut within the actuator.

14. The humanoid robot of claim 10, wherein the finger actuator further includes:

a housing for the actuator assembly, wherein the ball screw the ball nut and the tendon are at least partially located within the housing;

a position sensor mounted to the housing; and a magnet mounted to the ball nut to sense a relative linear position of the ball nut along the ball screw.

15. The humanoid robot of claim 10, further including:

a conduit liner surrounding the tendon for a substantial length of the tendon; and wherein the conduit surrounds the conduit liner for a substantial length of the tendon.

16. The humanoid robot of claim 15, wherein the conduit is formed from a coil of wire, and wherein the wire has one of a square and rectangular cross-sectional shape.

17. The humanoid robot of claim 15, wherein the conduit extends from the actuator assembly to the tension sensor.

* * * * *